UNITED STATES PATENT OFFICE.

PAUL CLÉMENT ROUSSEAU AND MARIE JEAN DE CHANTÉRAC, OF PARIS, AND MARIE JOSEPH DENIS ALEXANDRE DE LA BAUME, OF TOURTOUR, FRANCE.

METHOD FOR THE PURIFICATION OF ALCOHOLIC LIQUIDS.

SPECIFICATION forming part of Letters Patent No. 470,447, dated March 8, 1892.

Application filed August 28, 1890. Serial No. 363,344. (No specimens.) Patented in Belgium July 27, 1889, No. 87,163; in Luxemburg July 30, 1889, No. 1,161; in England July 31, 1889, No. 12,186; in Germany July 31, 1889, No. 53,495; in Italy September 30, 1889, XXIII, 25,938; in Spain October 11, 1889, No. 9,882; in Portugal February 19, 1890, No. 1,432, and in Brazil July 1, 1890, No. 883.

*To all whom it may concern:*

Be it known that we, PAUL CLÉMENT ROUSSEAU and MARIE JEAN DE CHANTÉRAC, of Paris, and MARIE JOSEPH DENIS ALEXANDRE DE LA BAUME, of Tourtour, France, all citizens of the Republic of France, have invented a new and Improved Method for the Purification of Alcohol, Distilled Liquors, Wines, Rums, Spirits, &c., and of all Alcoholic Liquids and Drinks in General, (patented in England July 31, 1889, No. 12,186; in Belgium July 27, 1889, No. 87,163; in Germany July 31, 1889, No. 53,495; in Luxemburg July 30, 1889, No. 1,161; in Italy September 30, 1889, XXIII, 25,938; in Spain October 11, 1889, No. 9,882; in Portugal February 19, 1890, No. 1,432, and in Brazil July 1, 1890, No. 883,) of which the following is a full, clear, and exact description.

The complete elimination of all impure substances from impure alcohols and alcoholic products in such a manner as to obtain rapidly and at small cost absolutely pure products is a matter of considerable importance as much from an industrial point of view as in view of the public health. Numerous experiments have been made in this direction, notably in the course of these last few years, and it cannot be said that any of the methods submitted has given a satisfactory result.

As a result of the long experience which we have had we have succeeded in discovering a method of purification so exceedingly simple that it does not require special apparatus and can be adapted to all those apparatuses in use, and which is so thoroughly efficient as regards the state of purity of the alcohol attained thereby that it can be used with advantage for the treatment of alcohols in every degree, and of alcoholic liquors valueless and useless on account of their impure condition, be it unrefined, sour, fermented, &c.

This method of purification is essentially characterized by the use of two agents, from the action of which, taken first separately and then conjointly, we can get from the most impure distilled liquid alcohol in some degree chemically pure. These agents are basic tartrates, hyposulphites.

All the basic tartrates may be used for the purification of alcohols. We, however, prefer tartrate of potash or soda, and particularly the double tartrate known under the name of "Seignette's salt."

Among the hyposulphites we have had excellent results from baryta and soda hyposulphites.

The operation is effected as follows: The alcoholic liquid to be treated having been put in a receiver of any shape whatever, closed as much as possible to avoid waste by evaporation, we put in the tartrate alone in gradual portions, stirring the mixture meanwhile until the liquid becomes absolutely neutral to the reagents or shows a slight alkaline reaction. We then allow the liquid which we have previously stirred to remain at rest, and it now becomes limpid and leaves at the bottom of the receiver a considerable amount of precipitate varying according as the alcohol just treated was more or less charged with impurities. The duration of this part of the operation depends equally on the state of purity of the distilled liquor and may vary from several hours to as many days. The conditions in which we work is not a matter of indifference, for it is to be noticed that light and heat accelerate the operation. The duration of the operation can be shortened to several hours only by heating the liquid to be treated during the time of operation; but in this case closed vessels will be indispensable for the operation in order to avoid waste by evaporation. When we see that the limpid state of the liquid is complete, we then introduce into the receiver a portion of hyposulphite corresponding to about one-third the weight of the basic tartrate previously used. We notice, also, that as in the case of the tartrate, the amount of hyposulphite which should be employed will vary with the nature and quantity of the impurities contained in the alcoholic liquid to be treated. In addition we notice that the proportion of hyposulphite introduced is sufficient if some time after its introduction there should gather a slight crystalline precipitate at the bottom of the receiver, the liquid treated becoming clear and limpid. It is to be noticed that the impure liquid only absorbs the amount of reagent which is required for its purification, an excess of hyposulphite having no visible effect on the final result of the operation. We notice that the operation is ended when the liquid having been several times stirred becomes, when left alone for a while, limpid again. The purified liquid is then divided from the precipitates which have formed by filtering, decanting, or any other means. It is then refined by distillation or otherwise in the usual apparatuses.

The purifying method forming the object of the present application can be used for all alcoholic liquids and drinks, and notably for wines, rums, and spirituous liquors, the taste of which it improves to a considerable extent.

It is, as we have seen, the treatment first separately and then combined of unrefined alcohols or other impure alcoholic liquids, first by alkaline tartrates and then the hyposulphites in the same receiver or in receivers first apart and then joined, which form the characteristic bases of our method, the use of each of these agents alone or their application in inverse order not giving the desired result.

What we claim is—

The herein-described process of purifying impure alcohols, distilled liquors, wines, rums, spirituous liquors, &c., which consists in treating such impure liquids with a basic tartrate and subsequently with a hyposulphite, substantially as set forth.

In testimony whereof we have signed this specification in the presence of two subscribing witnesses.

PAUL CLÉMENT ROUSSEAU.
MARIE JEAN DE CHANTÉRAC.
MARIE JOSEPH DENIS
      ALEXANDRE DE LA BAUME.

Witnesses:
  JOSEPH TOURNIER,
  EDWARD P. MACLEAN.